(12) United States Patent
Jaeb et al.

(10) Patent No.: US 12,079,792 B2
(45) Date of Patent: Sep. 3, 2024

(54) SYSTEM FOR CONDUCTING TRANSACTIONS

(71) Applicant: CityCheers Media Corp., Dallas, TX (US)

(72) Inventors: Winston Jaeb, San Jose, CA (US); D'Arcy J. LaForge, San Jose, CA (US); Chris Windle, Cupertino, CA (US)

(73) Assignee: CityCheers Media Corp., Dallas, TX (US)

( * ) Notice: Subject to any disclaimer, the term of this patent is extended or adjusted under 35 U.S.C. 154(b) by 0 days.

(21) Appl. No.: 17/145,135

(22) Filed: Jan. 8, 2021

(65) Prior Publication Data

US 2021/0216986 A1    Jul. 15, 2021

Related U.S. Application Data

(60) Provisional application No. 62/959,793, filed on Jan. 10, 2020.

(51) Int. Cl.
*G06Q 20/20* (2012.01)
*G06F 16/951* (2019.01)
*G06Q 20/40* (2012.01)

(52) U.S. Cl.
CPC ......... *G06Q 20/202* (2013.01); *G06F 16/951* (2019.01); *G06Q 20/401* (2013.01)

(58) Field of Classification Search
None
See application file for complete search history.

(56) References Cited

U.S. PATENT DOCUMENTS

| | | | | |
|---|---|---|---|---|
| 6,175,823 | B1* | 1/2001 | Van Dusen | G06Q 30/0635 705/26.81 |
| 8,768,838 | B1* | 7/2014 | Hoffman | G06Q 40/00 705/72 |
| 9,760,871 | B1* | 9/2017 | Pourfallah | G06Q 10/10 |
| 10,115,141 | B1* | 10/2018 | Warman | H04L 63/0281 |
| 10,318,941 | B2* | 6/2019 | Chawla | G06Q 10/10 |
| 10,360,296 | B2* | 7/2019 | Greiner | G06N 7/02 |
| 10,395,223 | B2* | 8/2019 | Muthu | G06Q 20/405 |
| 10,438,176 | B2* | 10/2019 | Johnson | G06Q 20/20 |
| 10,500,481 | B2* | 12/2019 | Rose | G06Q 20/425 |
| 10,515,345 | B2* | 12/2019 | Koh | G06Q 20/4014 |
| 10,754,936 | B1* | 8/2020 | Hawes | G06F 21/45 |
| 10,853,779 | B1* | 12/2020 | Wang | G06T 7/70 |
| 10,853,783 | B1* | 12/2020 | Maeng | G06Q 20/3224 |
| 10,853,799 | B2* | 12/2020 | Kassemi | G06Q 10/107 |

(Continued)

*Primary Examiner* — Fateh M Obaid
(74) *Attorney, Agent, or Firm* — Innovation Counsel LLP

(57) ABSTRACT

A method of conducting a transaction between a merchant Point of Sale system (POS) and a customer device is presented. The method entails obtaining a ticket directly from the merchant POS via a plug-in application, the ticket including a merchant identification, a customer identification, ordered items, and prices of the ordered items; activating a web portal to interface the customer device; reporting ordered items and prices to the client device, and receiving payment authorization from the customer device; generating a login token via a payment engine to contact a gateway to a financial transaction site; and in response to receiving authorization from the gateway, contacting the merchant POS to complete the transaction.

20 Claims, 7 Drawing Sheets

(56) References Cited

U.S. PATENT DOCUMENTS

| | | | | |
|---|---|---|---|---|
| 11,100,475 B2* | 8/2021 | Edwards | | G06N 20/00 |
| 11,250,492 B2* | 2/2022 | Harrell | | G06Q 30/0643 |
| 2003/0220841 A1* | 11/2003 | Maritzen | | G06Q 30/06 |
| | | | | 705/26.41 |
| 2004/0172339 A1* | 9/2004 | Snelgrove | | G06Q 20/00 |
| | | | | 705/26.1 |
| 2004/0249712 A1* | 12/2004 | Brown | | G06Q 30/0217 |
| | | | | 705/14.19 |
| 2005/0203765 A1* | 9/2005 | Maritzen | | G06Q 30/00 |
| | | | | 705/26.1 |
| 2006/0006226 A1* | 1/2006 | Fitzgerald | | H04W 12/06 |
| | | | | 235/380 |
| 2006/0122870 A1* | 6/2006 | Austin | | G06Q 40/08 |
| | | | | 707/999.009 |
| 2008/0051071 A1* | 2/2008 | Vishwanathan | | H04M 3/42051 |
| | | | | 455/414.1 |
| 2008/0120423 A1* | 5/2008 | Hall | | H04L 63/20 |
| | | | | 709/229 |
| 2009/0013055 A1* | 1/2009 | Hall, Jr. | | H04L 67/125 |
| | | | | 709/208 |
| 2009/0144161 A1* | 6/2009 | Fisher | | G06Q 30/0255 |
| | | | | 705/16 |
| 2010/0268645 A1* | 10/2010 | Martino | | G06Q 20/405 |
| | | | | 705/44 |
| 2012/0095819 A1* | 4/2012 | Li | | G06Q 30/02 |
| | | | | 705/14.23 |
| 2012/0215553 A1* | 8/2012 | Leston | | G06Q 10/10 |
| | | | | 705/2 |
| 2012/0215584 A1* | 8/2012 | Narsude | | H04L 43/06 |
| | | | | 705/7.29 |
| 2012/0316963 A1* | 12/2012 | Moshfeghi | | G06Q 20/327 |
| | | | | 705/14.58 |
| 2012/0330744 A1* | 12/2012 | Aissa | | G06Q 20/387 |
| | | | | 705/14.38 |
| 2012/0330769 A1* | 12/2012 | Arceo | | G06Q 20/4014 |
| | | | | 455/411 |
| 2013/0054454 A1* | 2/2013 | Purves | | H04L 67/306 |
| | | | | 705/41 |
| 2013/0103518 A1* | 4/2013 | Fisher | | G06Q 20/4012 |
| | | | | 705/44 |
| 2013/0124291 A1* | 5/2013 | Fisher | | G06Q 20/326 |
| | | | | 705/14.23 |
| 2013/0124423 A1* | 5/2013 | Fisher | | G06Q 20/204 |
| | | | | 705/72 |
| 2013/0275192 A1* | 10/2013 | Aissa | | G06Q 30/0226 |
| | | | | 705/14.15 |
| 2013/0305035 A1* | 11/2013 | Lyne | | G06Q 20/3278 |
| | | | | 713/150 |
| 2014/0019352 A1* | 1/2014 | Shrivastava | | G06Q 20/326 |
| | | | | 705/41 |
| 2014/0136949 A1* | 5/2014 | Wang | | G06F 40/143 |
| | | | | 715/234 |
| 2014/0180777 A1* | 6/2014 | Moshrefi | | G06Q 20/20 |
| | | | | 705/21 |
| 2015/0347734 A1* | 12/2015 | Beigi | | H04L 9/3268 |
| | | | | 726/28 |
| 2016/0005029 A1* | 1/2016 | Ivey | | G09C 1/00 |
| | | | | 705/44 |
| 2016/0055322 A1* | 2/2016 | Thomas | | H04L 63/0876 |
| | | | | 726/7 |
| 2016/0314479 A1* | 10/2016 | Kulasooriya | | G06Q 30/02 |
| 2016/0364717 A1* | 12/2016 | Lyne | | G06Q 20/3415 |
| 2017/0046706 A1* | 2/2017 | Agarwal | | G06Q 20/4016 |
| 2019/0228461 A1* | 7/2019 | Domokos | | G06Q 30/0201 |
| 2020/0051117 A1* | 2/2020 | Mitchell | | G06Q 30/0239 |
| 2020/0364720 A1* | 11/2020 | Lally | | G06Q 20/4037 |
| 2020/0387923 A1* | 12/2020 | Mitchell | | G06Q 20/387 |
| 2020/0394620 A1* | 12/2020 | Kim | | G06Q 20/02 |
| 2021/0216986 A1* | 7/2021 | Jaeb | | G06Q 20/204 |

* cited by examiner

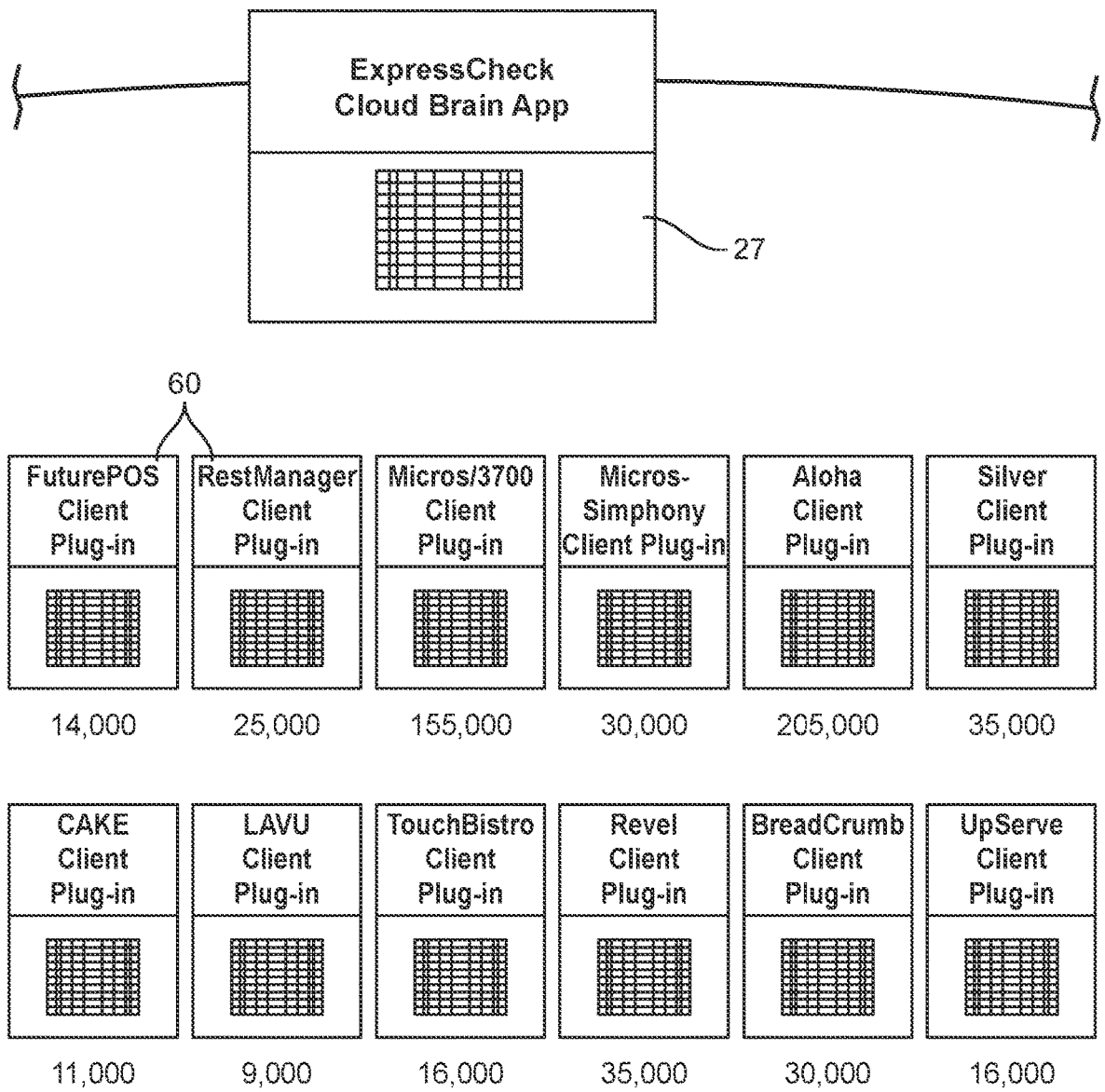
FIG. 4 (Cont. 1)

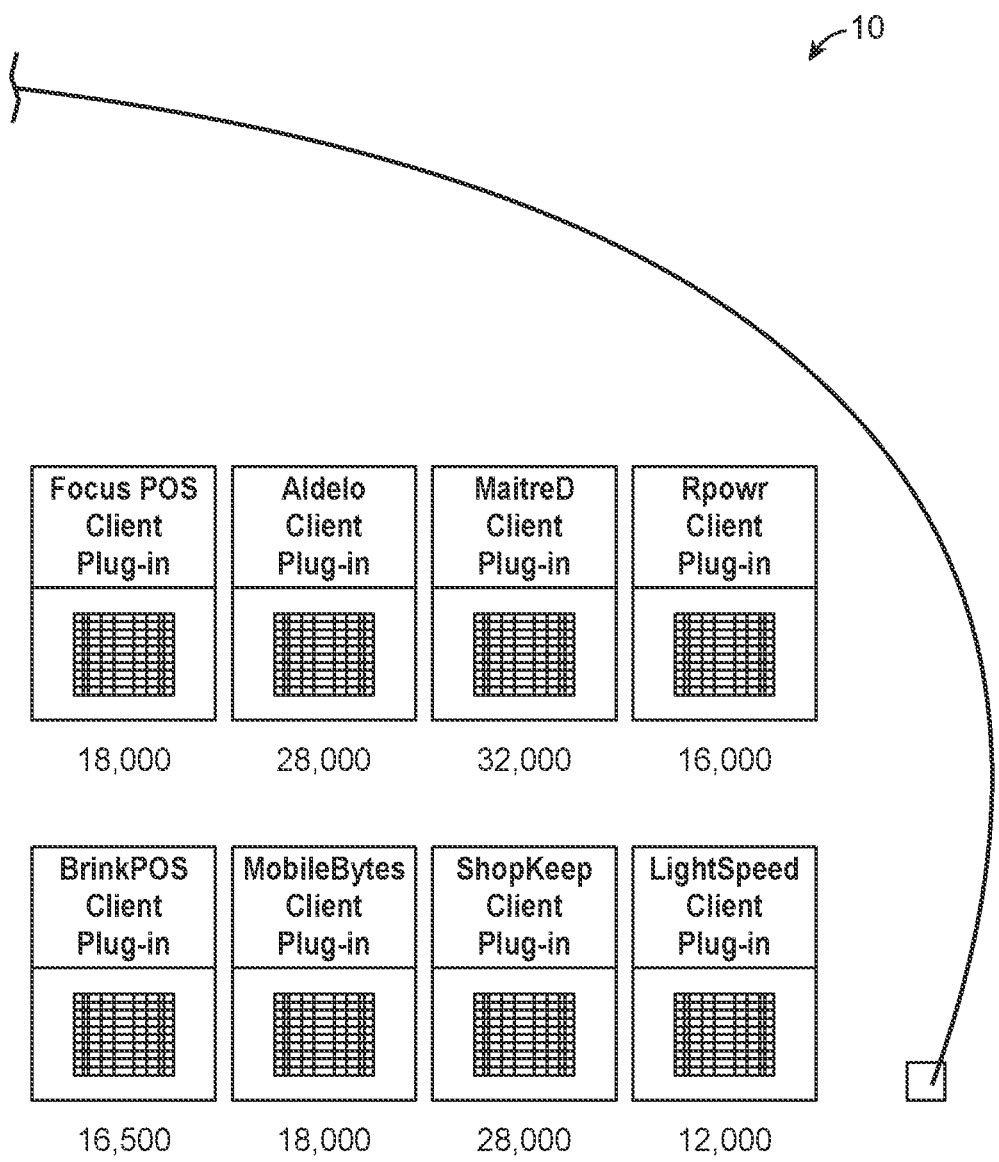
FIG. 4 (Cont. 2)

SYSTEM FOR CONDUCTING TRANSACTIONS

CROSS-REFERENCE TO RELATED APPLICATION(S)

This application claims the benefit of U.S. Provisional Application No. 62/959,793 filed on Jan. 10, 2020, the content of which is incorporated herein by reference.

BACKGROUND

Present disclosure relates to a system for conducting electronic transactions.

Modern Point of Sale (POS) systems have greatly increased the ease and convenience with which many modern financial transactions are conducted. By providing a single location at which a customer's bill is totaled, payment is taken, corresponding records are stored, and a receipt is issued, POS systems allow customers and merchants to complete and record their transactions quickly and easily.

POS systems are, however, not without their drawbacks. POS systems can be expensive and burdensome for merchants to install or implement. Numerous different POS systems exist, many of which do not accept every payment form. POS systems also often rely on a single piece of hardware, such as a register, that requires customers to move to that location to conduct their transactions. Attempts to solve this problem by implementing multiple POS registers at a single merchant incur significant expense due to the added hardware required.

Conventional online fixes for these problems typically involve use of a mobile application program, or mobile app, that customers can download and that allow customers to pay online through the mobile app. However, such mobile apps present their own challenges. For example, payment services often require customers to use their app, so that each app only allows payment through a single service. Customer payments are also sent to an account run by that payment service, rather than the bank account of the customer's choice. Also, the requirement to download and install an app can lead to clutter if a customer desires to use multiple different payment services at different times, and thus must download/install multiple apps just for payment. Finally, app download and installation may simply require time and effort that customers do not wish to invest, and can compromise customer security if the app is ever compromised.

Ongoing efforts thus exist to improve the ways by which customers and merchants conduct transactions.

SUMMARY

In one aspect, a method and system for conducting a transaction between a merchant Point of Sale system (POS) and a customer device are presented. The method entails obtaining a ticket directly from the merchant POS via a plug-in application, the ticket including a merchant identification, a customer identification, ordered items, and prices of the ordered items; activating a web portal to interface the customer device; reporting ordered items and prices to the client device, and receiving payment authorization from the customer device; generating a login token via a payment engine to contact a gateway to a financial transaction site; and in response to receiving authorization from the gateway, contacting the merchant POS to complete the transaction.

BRIEF DESCRIPTION OF THE DRAWINGS

For a better understanding of the invention, reference should be made to the following detailed description taken in conjunction with the accompanying drawings, in which.

Like reference numerals refer to corresponding parts throughout the drawings. The various Figures are not necessarily to scale.

DETAILED DESCRIPTION

The disclosure pertains to a system that allows customers and merchants to conduct electronic transactions without requiring the merchant to purchase and install a separate software program or application for its POS system. A transaction support provider's server connects to, or plugs into, a merchant's POS server, allowing the merchant to access the transaction support provider's services.

The system includes a merchant-specific customer interface program (such as a mobile application, native application, or a website) that customers can access with their devices, such as mobile devices. The merchant-specific customer interface program works together with the plug-in application of the transaction support provider's server (e.g., CityCheers server) to allow customers to pay their bills. In particular, the merchant records the amount owed by the customer into its plug-in application. The customer can then pay his/her amount owed electronically, through the transaction support provider's server, whenever it is convenient for the customer either on or off premises. Customers can pay conveniently at their table or off premises, without being restricted to a certain radius of the merchant's POS register. Merchants are relieved from having to physically present customers their bills.

A "plug-in" application, as used herein, is an add-on or extension piece of computer software that adds new functions to a host program without altering the host program itself. In the particular context of this disclosure, the host program is the merchant POS.

Figure 1:
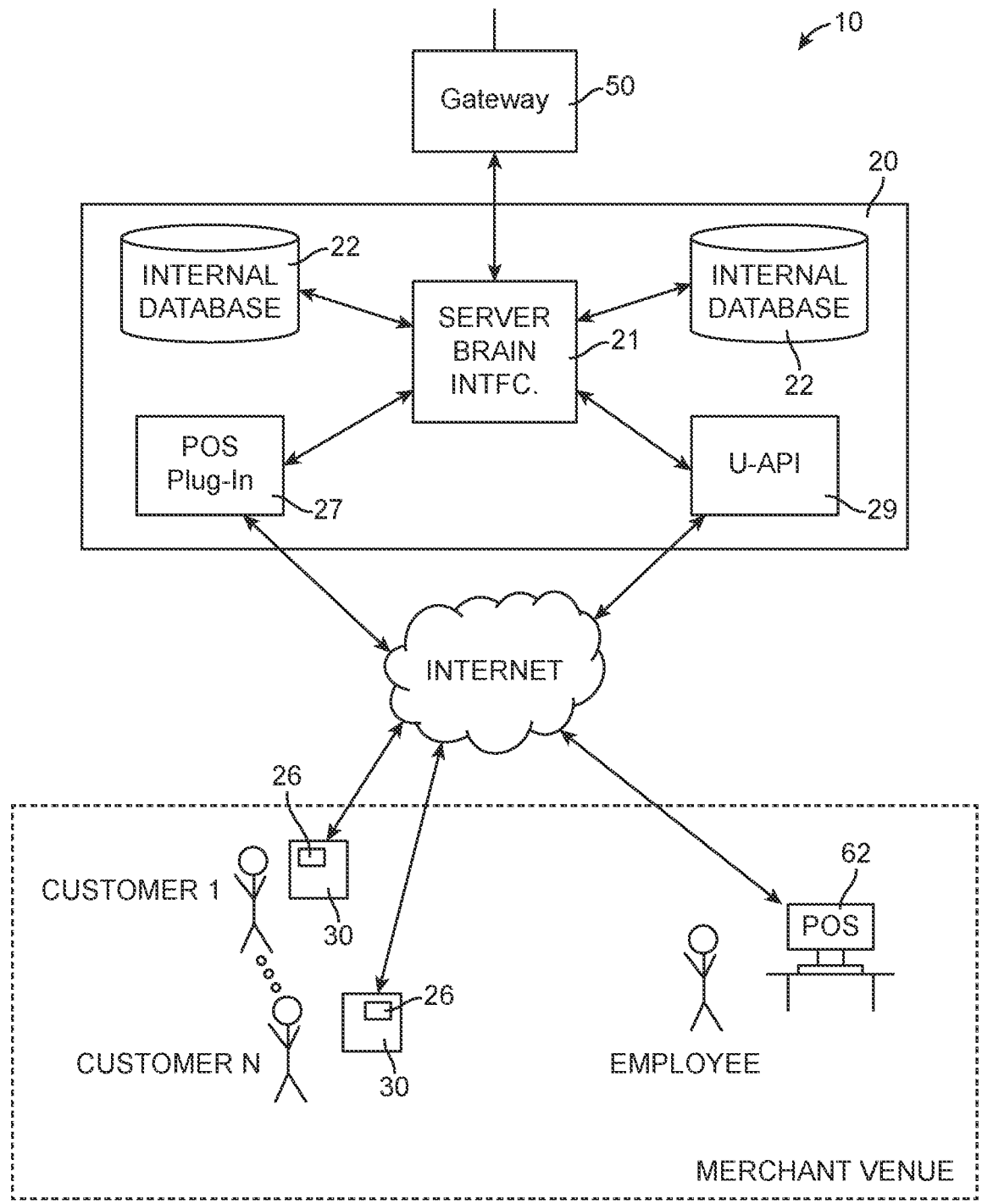
FIG. 1 illustrates an exemplary computer-based system for implementing embodiments of the present inventive concept.

FIG. 1 illustrates an example transaction system 10 for implementing an embodiment of the inventive concept. Generally, the transaction system 10 includes a transaction support provider's server 20 communicating with a merchant POS register 62 and customer devices 30 via a communication network (e.g., the Internet). Although FIG. 1 shows only two merchant devices 30 and one POS register 62, this is done for simplicity of illustration and there is no limit to the number of customer devices 30 and merchant POS registers 62 that may be included in the transaction system 10. The customer device 30 may be any computing device with network connection capability, including but not limited to smart phones, tablets, mobile phones, laptops, etc.

The transaction support provider's server 20 includes a Cloud Server Brain Interface 21, at least one internal database 22, a POS Plug-In Application 27 that connects to the merchant server, and a U-API 29 for connecting to a customer application 26 that interfaces the customer device 30.

The transaction system 10 also includes a gateway 50, which is a known hosted software product that provides integration between the websites 24 and other elements of an electronic payment processing network. These elements include credit card networks and bank servers. These other elements and their interactions with gateway 50 are known.

Figure 2:
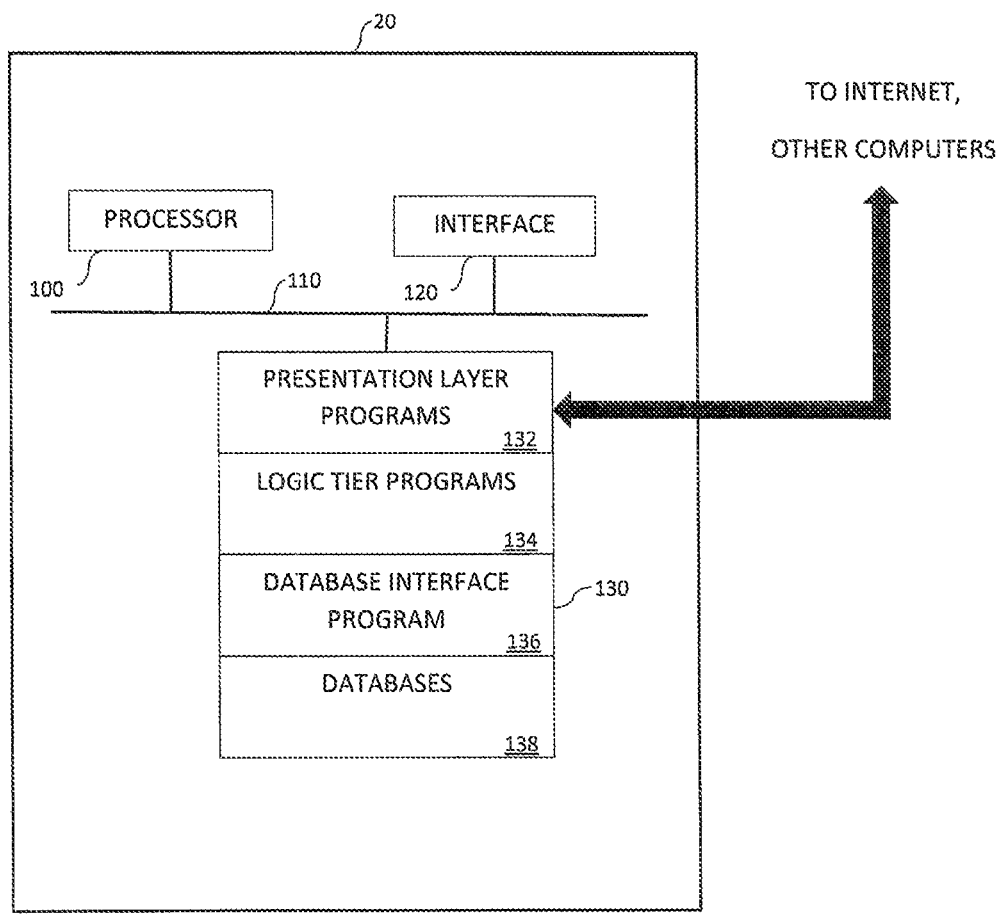
FIG. 2 conceptually illustrates further details of a server for implementing embodiments of the present inventive concept.

While the transaction support provider's server 20 and various other computation devices of FIG. 1 can be constructed in any manner deemed suitable by a person of ordinary skill in the art, FIG. 2 illustrates an example embodiment of the server 20. As shown, the transaction support provider's server 20 includes a processor 100, bus 110, interface 120, and memory 130. The processor 100, interface 120, and memory 130 are in communication across the bus 110. The processor 100 executes instructions contained in the programs of memory 130, while the interface 120 allows communication with the other computation devices of FIG. 1 via the Internet or other communication medium. The processor 100, interface 120, and programs of the memory 130 which carry out the above and below processes collectively can be referred to as the Cloud Server Brain Interface 21.

The memory 130 stores a number of programs, including presentation layer programs 132, logic tier programs 134, database interface programs 136, and databases 138. The databases 138 may include any of the databases used to organize and store information, including the internal database(s) 22. The database interface programs 136 may include those programs configured to act as an interface for the databases 138 to the logic tier 134, as is known. The logic tier programs 134 are database access layer programs, and access the database interface programs 136 as well as other remote programs (such as financial transaction, authentication, etc. programs) to retrieve desired information stored in the databases 138 or store information as appropriate. The logic tier programs 134 transfer information between end user application programs and databases 138, to allow for the transfer of information between the databases 138 and customers/merchants. The construction of such logic tier programs 134 is known. The presentation layer programs 132 are application programs providing an interface to end users, and include programs and other code such as those of websites.

Figure 3:
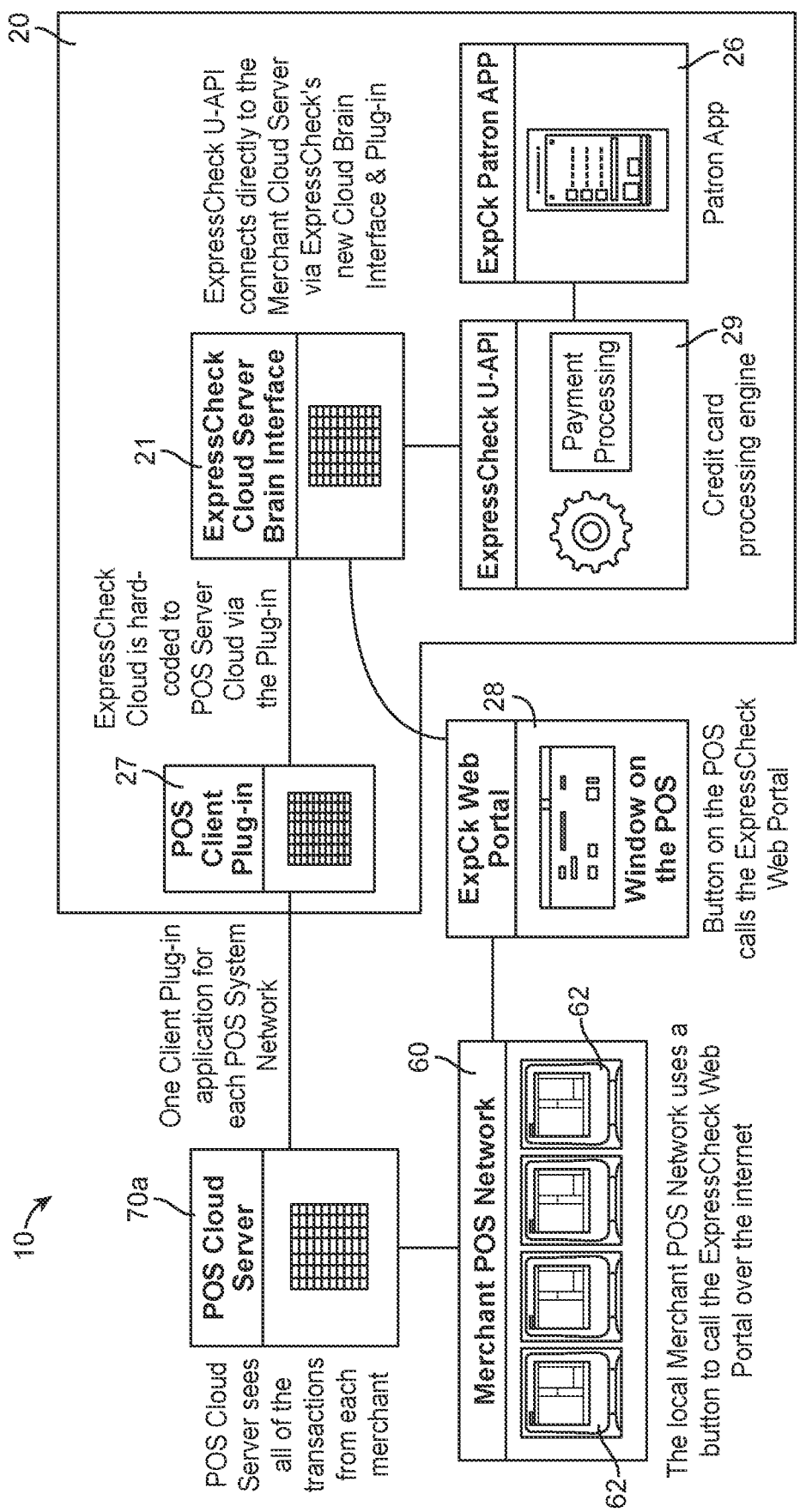
FIG. 3 illustrates an example system for implementing embodiments of the inventive concept where the merchant server is a cloud-based server.

FIG. 3 illustrates an example system for implementing embodiments of the inventive concept. In the example embodiment shown in FIG. 3, merchants have a POS network 60 that includes a plurality of POS registers 62. The POS network 60 communicates with a POS Server 70a, which in this example is a Cloud server. The POS server 70 is capable of connecting to a transaction support provider's server 20 via the Internet or other computer-based communications network.

The transaction support provider's server 20 includes a Cloud Server Brain Interface 21 with a POS Plug-in application 27. In some embodiments, there is one POS Plug-in application 27 for each merchant POS network 60. The Cloud Server Brain Interface 21 is hard-coded to the POS Cloud Server 70a via the POS Plug-in application 27. When a merchant enters orders, charges, etc. onto the POS register 62, the input information goes to the POS Cloud Server 70a and to the Cloud Server Brain Interface 21 via the POS Plug-in application 27. Since the POS Plug-in application 27 captures the merchant data from the backend, the merchant POS registers 62 do not need to purchase and install new software that works with the transaction support provider server 20. In some embodiments, the local merchant POS network 60 uses a button to connect to a Brain Interface Web Portal 28 over the network (e.g., Internet), which gives access to the Cloud Server Brain Interface 21.

The transaction support provider's server 20 also supports an interface that runs on the customer device 30, which may be a computing device such as a tablet, a laptop, or a mobile phone. The interface that runs on customer device 30 may be an application that is downloaded by the customer. The transaction support provider's server 20 interacts with the application on the customer device 30 via a U-API engine 29, which is a credit card processing engine. By having the transaction support provider's server 20 hard-coded to the merchant's POS server 70a via the Plug-In application 27, and by having the U-API engine 28 connect the merchant POS network 60 to the Cloud Server Brain interface 21, any complications due to merchant POS software conflict is avoided.

Figure 4:
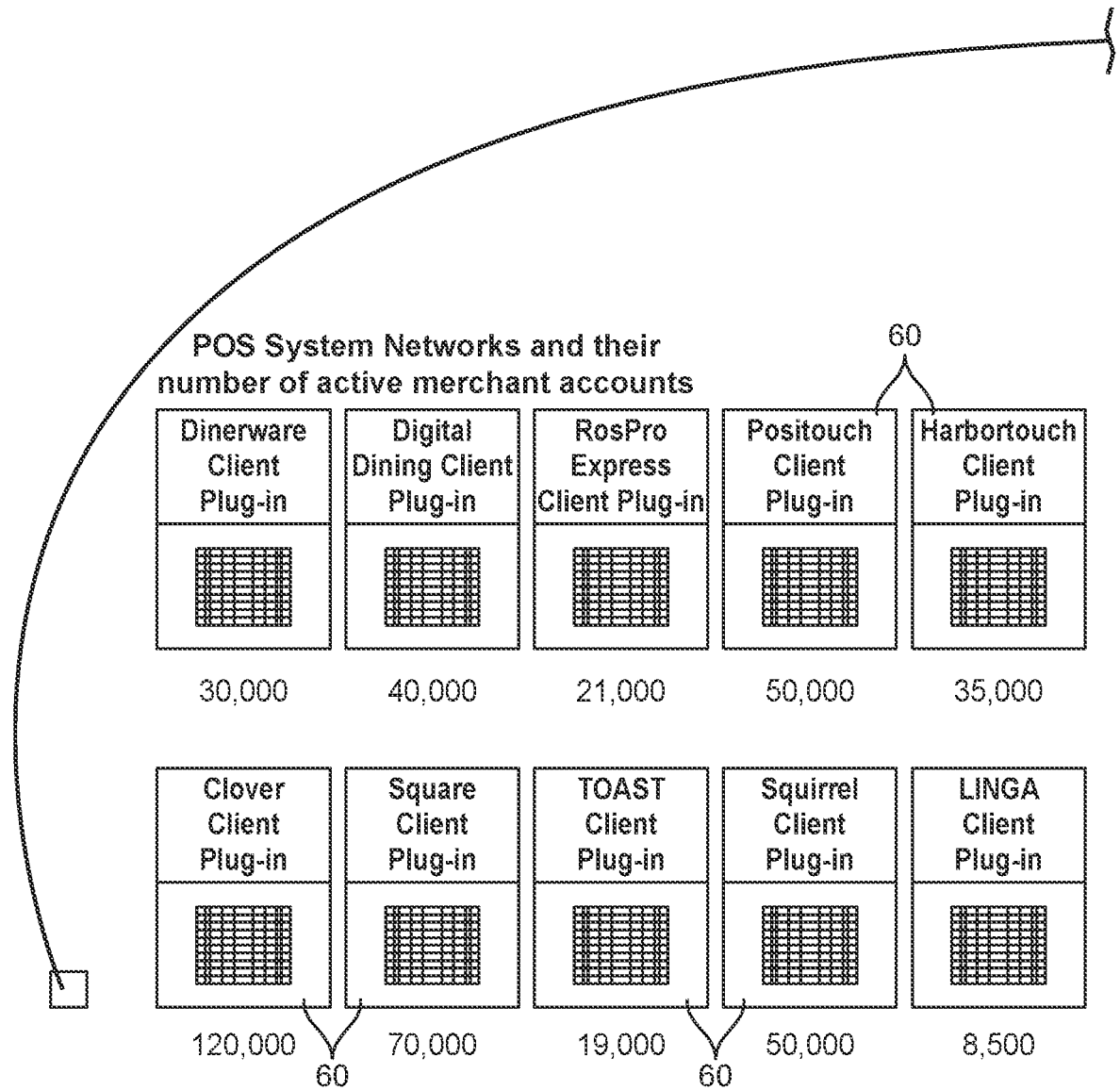
FIG. 4 illustrates how the transaction support provider's server is able to quickly connect to any POS operating system.

FIG. 4 illustrates how the transaction support provider's server 20 can quickly connect to any POS operating system (Windows/Linus/iOS/Android) because the calls are executed via a cloud-based Brain Application that works with the POS client plug-in application 27. The POS Client plug-in application 27 makes the integration of transaction support provider's server 20 and the POS network simple, fast, and secure.

Figure 5:
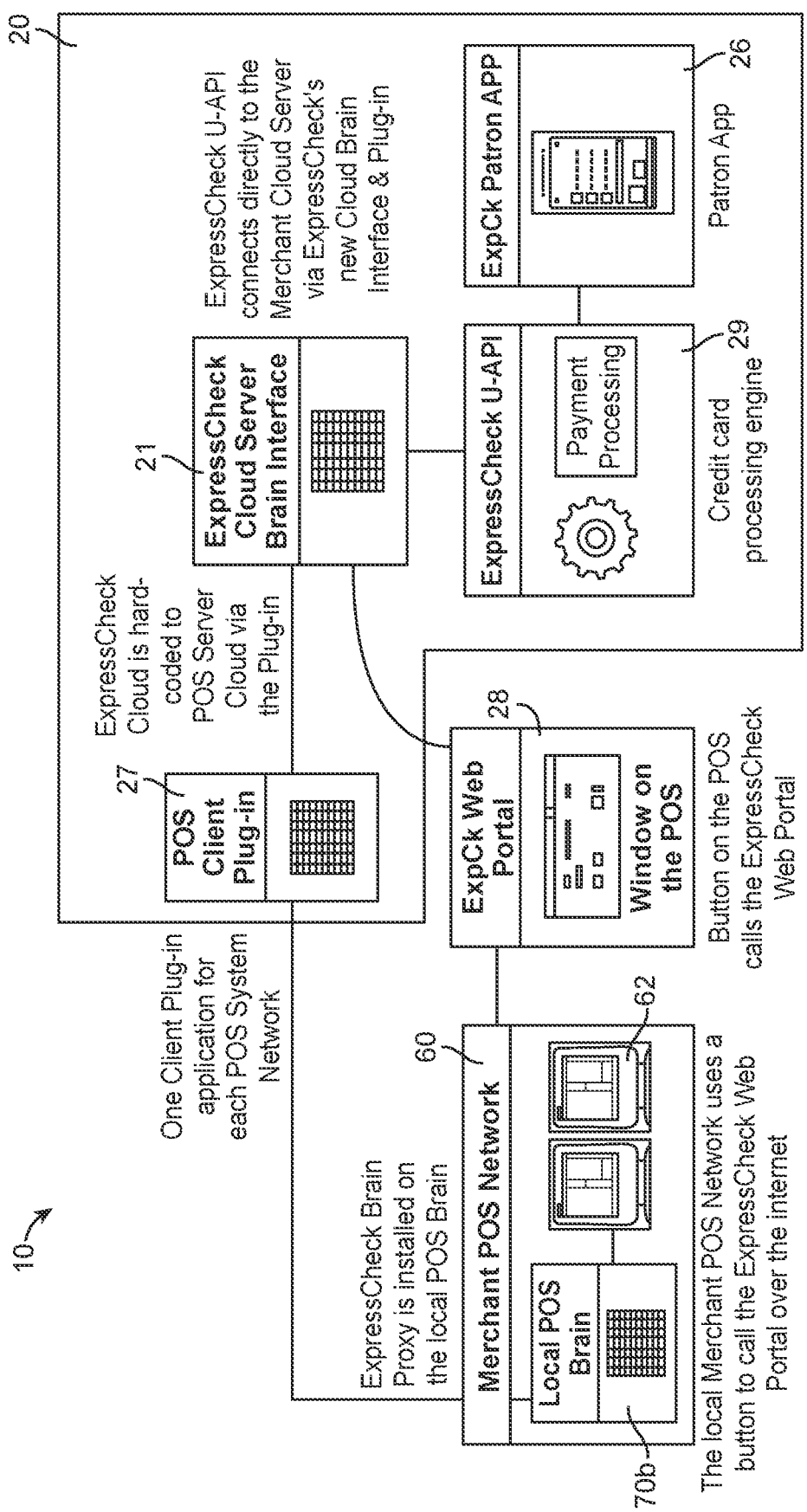
FIG. 5 illustrates an example system for implementing embodiments of the inventive concept where the merchant server is a local server.

FIG. 5 illustrates an example system for implementing embodiments of the inventive concept where the merchant server is a local server instead of a cloud-based server as in the example of FIG. 3. When the merchant's server is a local server, the POS server 70 and the POS registers 62 are part of the merchant POS network 60. There is one POS Plug-in application 27 for each POS network 60. The transaction support provider's server 20 is hard-coded to POS Server via the Plug-in application 27. The U-API engine 29 connects directly to the merchant's POS network 60 via the Cloud Server Brain Interface 21 and the plug-in application 27. The Merchant POS network 60 may also access the Cloud Server Brain Interface 21 via a Web Portal 28. There may be a button on the POS register 62 for calling the Web Portal 28.

The transaction process begins when a customer who is a registered user of the transaction system arrives at an establishment that is enabled to process transactions through the transaction system 10. The customer may use his customer device 30 (running a native app or web browser) to login to the transaction support provider's server 20 using his credentials and check in at the selected venue location. The check-in process causes the Cloud Server Brain Interface 21 to update the database and associate the customer ID with the merchant ID, indicating that the customer is checked-in at the merchant's venue and waiting for a ticket to be assigned.

Once the customer is seated and introductions are made by the wait staff, the wait staff takes the customer's order. The customer announces his intention to pay his ticket through the transaction system 10. The wait staff proceeds to enter the order on their order entry device or by taking the information back to enter on a POS register 62 in the ordinary manner. The information entered into the POS register 62 enters the POS database that is either connected via a POS Cloud Server 70a (FIG. 3) or is located onsite at the venue in a POS Local Server 70b (FIG. 5).

In the scenario where there is a POS cloud server 70, as illustrated in FIG. 3, the POS Client Plugin 27 running on the Cloud Server Brain Interface 21 contacts the POS Cloud Server 70a via an API created and made available at the venue location. These are then stored in the Cloud Server Brain Interface 21 internal database 22. The ticket details are also requested through this interface by the Cloud Server Brain Interface 21 which will then store the ticket information in the internal database 22. Periodically, this information will be queried and updated to reflect any changes e.g., customer adds or modifies orders, ticket is paid locally using cash, etc.).

In the scenario where the merchant server is a local server 70b, as illustrated in FIG. 5, a Lightweight Brain application (not shown) and POS Client plugin application 27 are installed and running on the local POS server 70b at the merchant venue. These communicate with the POS registers 62 via an API created by the POS manufacturer and made available to retrieve the summary of open tickets and ticket details in the same way as the Cloud Server Brain Interface 21 does in the case of FIG. 3. The Lightweight Brain application 80 sends the information to the Cloud Server Brain Interface 21 via a secure connection, where it is stored and updated in the internal database 22 in the same way as in FIG. 3.

The entire process of the assignment of ticket and ticket details being transferred takes place within just a few seconds after the order is entered by the wait staff. After order entry is completed, the wait staff activates the Web Portal 28, perhaps by clicking on a button that is installed on the POS register 62, a handheld device, an order entry device, a designated tablet, etc. When Web Portal is opened on the display device, the wait staff will log in using their merchant credentials, if not already logged in. The login authorizes the Web Portal for use with the Server 20 via a secure connection. Once logged in, the Cloud Server Brain Interface 21 will retrieve the list of checked in or active customers from its internal database 22 and display this via the Web Portal 28 as a list of customers. Depending on the embodiment, the list may be detailed or include thumbnail photos. The wait staff need only click on the name or photo of the customer to view the list of open tickets from the POS register 62. An "open" ticket is a ticket that has not had a completed payment transaction. The list of open tickets is displayed by the server brain interface 21 from its internal database 22. The Web Portal will update the list of displayed customers with the customers now shown as assigned tickets.

After this, the customer can open his customer app 26 through the mobile device 30, perhaps as a native app or web-based app, and go to the ticket to see the order details associated with the ticket or the customer ID. The order details were reported by the Cloud Server Brain Interface 21 via the U-API 29 to the customer app 26. This ability to check the ticket details gives the customer a chance to correct any ordering error or add items before the order is even delivered.

The wait staff proceeds normally to deliver the customer's order when it is ready. Under conventional situations today, when the customer is finished with his meal, he would wait for the staff to bring him his bill after printing it at the POS, determine how to pay (e.g., by cash, credit card, debit card, gift card), wait for the staff to pick up the payment, process it as the POS register, and bring it back to the customer. With the transaction system 10, the wait staff is done after the meal is delivered to the table. When the customer is finished with his meal, he uses his customer device 30 and uses the customer app 26 to pay for the meal and maybe tip. Optionally, he may choose a rating on the service. As soon as this is done and transaction confirmation is received, the customer is done and the ticket is closed.

As soon as the customer authorizes payment, the authorization request is generated by the U-API 29, which will trigger the user login token to be used to contact the payment processing gateway 50 to authorize the transaction. There are no credit card numbers used or exposed in this process, making this a secure method of performing the transaction with a significantly reduced risk of fraud or theft compared to the traditional credit-card-based methods. Once the payment gateway 50 authorizes the transaction, it will deduct the amount from the customer's financial institution or card of choice. When the payment is authorized, the Cloud Server Brain Interface will contact the POS register 62 through the POS Client Plugin application 27 or Local Lightweight Brain application with Client POS plugin using POS transaction API to complete the transaction in the POS, indicating the amount paid for the ticket and the tip amount chosen by the customer. The Cloud POS Server 70a or the Local POS Server 70b will then close the ticket the same way it normally would for tickets paid in cash or by credit card onsite.

If, for some reason, the customer does not pay the ticket using the customer app 26 or the Web Interface, and walks out of the merchant venue without paying, the venue still has the customer associated with the ticket displayed on the Web Portal 28. The merchant may select the customer details and force the ticket to be paid. The mere possibility that this can be done may enough deterrent to cut down on the numbers of diners that leave without paying.

A feature that makes this process even more advantageous is that the device used at the merchant venue to assign the customer a ticket needs only be any device that is capable of a browser interface with an acceptable level of security. The merchant is relieved from having to purchase a new system or install a new software.

The foregoing description, for purposes of explanation, used specific nomenclature to provide a thorough understanding of the inventive concept and the disclosure. However, it will be apparent to one skilled in the art that the specific details are not required in order to practice the inventive concept. Thus, the foregoing descriptions of specific embodiments are presented for purposes of illustration and description. They are not intended to be exhaustive or to limit the inventive concept to the precise forms disclosed. Many modifications and variations are possible in view of the above teaching.

The embodiments were chosen and described in order to best explain the principles of the inventive concept and its practical applications, to thereby enable others skilled in the art to best utilize the disclosure and various embodiments with various modifications as are suited to the particular use contemplated. Also, individual features of any of the various embodiments or configurations described above can be mixed and matched in any manner, to create further embodiments contemplated by the disclosure.

What is claimed is:

1. A method of conducting a transaction between a merchant Point of Sale system (POS) and a customer device, comprising:
   obtaining a ticket directly from the merchant POS via a plug-in application connected to the merchant POS, the ticket including a merchant identification, a customer identification, ordered items, and prices of the ordered items, wherein the merchant POS includes a POS register;

activating a web portal to interface the customer device;

reporting ordered items and prices to the client device, and receiving payment authorization from the customer device;

generating a login token via a payment engine to contact a gateway to a financial transaction site; and in response to receiving authorization from the gateway, contacting the merchant POS to complete the transaction on the ticket.

2. The method of claim 1, further comprising communicating with the merchant POS and the customer device via a web portal.

3. The method of claim 2, further comprising allowing the customer device that is associated with the customer identification to access orders that are associated with the customer identification via the web portal.

4. The method of claim 1, further comprising communicating with the customer device via a payment processing engine.

5. The method of claim 1, wherein the ticket is created by the merchant POS through a check-in process in response to a request from the customer device.

6. The method of claim 1 further comprising storing the ticket in a database with indication that the ticket is open.

7. The method of claim 6 further comprising generating a list of open-ticket customers based on information in the database, for presentation to a merchant device via a web portal.

8. The method of claim 7, wherein the ticket is created by a merchant device connected to the web portal.

9. The method of claim 1 further comprising closing the ticket after completing the transaction.

10. One or more non-transitory computer-readable media collectively storing instructions that, when executed, cause one or more computers to collectively perform a method of conducting a transaction between a merchant POS and a customer device, the instructions comprising:

instructions for obtaining a ticket directly from the merchant POS via a plug-in application connected to the merchant POS that includes a POS register, the ticket including a merchant identification, a customer identification, ordered items, and prices of the ordered items;

instructions for activating a web portal to interface the customer device;

instructions for reporting ordered items and prices to the customer device, and receiving payment authorization from the customer device;

instructions for generating a login token via a payment engine to contact a gateway to a financial transaction site; and instructions for contacting the merchant POS to complete the transaction on the ticket in response to receiving authorization from the gateway.

11. The non-transitory computer-readable media of claim 10, wherein the instructions further comprise instructions for communicating with the merchant POS and the customer device via a web portal.

12. The non-transitory computer-readable media of claim 11, wherein the instructions further comprise instructions for allowing the customer device that is associated with the customer identification to access orders that are associated with the customer identification via the web portal.

13. The non-transitory computer-readable media of claim 10, wherein the instructions further comprise instructions for communicating with the customer device via a payment processing engine.

14. The non-transitory computer-readable media of claim 10, wherein the ticket is created by the merchant POS through a check-in process in response to a request from the customer device.

15. The non-transitory computer-readable media of claim 10, wherein the instructions further comprise instructions for storing the ticket in a database with indication that the ticket is open.

16. The non-transitory computer-readable media of claim 15, wherein the instructions further comprise instructions for generating a list of open-ticket customers based on information in the database, for presentation to a merchant device via a web portal.

17. The non-transitory computer-readable media of claim 10, wherein the instructions further comprise instructions for closing the ticket after completing the transaction.

18. The method of claim 1, wherein the activating of the web portal is done by activating a predefined part on the POS register.

19. The method of claim 18, wherein the predefined part is a button.

20. The non-transitory computer-readable media of claim 10, wherein the instructions for activating a web portal is received via a predefined part on the POS register.

* * * * *